United States Patent
Saisho

(10) Patent No.: US 9,148,540 B2
(45) Date of Patent: Sep. 29, 2015

(54) IMAGE FORMING APPARATUS, CONTROLLING METHOD THEREFOR, AND STORAGE MEDIUM

(71) Applicant: CANON KABUSHIKI KAISHA, Tokyo (JP)

(72) Inventor: Kazuya Saisho, Fuchu (JP)

(73) Assignee: CANON KABUSHIKI KAISHA (JP)

(*) Notice: Subject to any disclaimer, the term of this patent is extended or adjusted under 35 U.S.C. 154(b) by 0 days.

(21) Appl. No.: 14/591,191

(22) Filed: Jan. 7, 2015

(65) Prior Publication Data
US 2015/0201100 A1    Jul. 16, 2015

(30) Foreign Application Priority Data
Jan. 10, 2014  (JP) .................................. 2014-003221

(51) Int. Cl.
*G06F 15/00* (2006.01)
*H04N 1/00* (2006.01)

(52) U.S. Cl.
CPC ......... *H04N 1/00893* (2013.01); *H04N 1/0001* (2013.01); *H04N 1/00029* (2013.01); *H04N 1/00076* (2013.01); *H04N 1/00899* (2013.01); *H04N 2201/0094* (2013.01)

(58) Field of Classification Search
USPC ........................................................ 358/1.14
See application file for complete search history.

(56) References Cited

U.S. PATENT DOCUMENTS

2009/0219560 A1*  9/2009  Yaoyama .................... 358/1.14

FOREIGN PATENT DOCUMENTS

JP    2002232625 A    8/2002
JP    2012123242 A    6/2012

* cited by examiner

*Primary Examiner* — Saeid Ebrahimi Dehkord
(74) *Attorney, Agent, or Firm* — Rossi, Kimms & McDowell LLP

(57) ABSTRACT

An image forming apparatus is disclosed that can specify the cause and the part of an electrical failure with an inexpensive configuration and facilitate the maintenance by a user or an administrator. Power is supplied to function units in the image forming apparatus and a value is detected by a power detection unit. A state of the image forming apparatus is specified by a first control unit that can determine, based on the specified state and the detected value, whether or not there is an electrical failure. If there is a determined electrical failure, the power is supplied separately to the function units so that the first control unit can specify an electrically failed part based on a state of the image forming apparatus estimated at the separate supply and the detected value, and can notify a user or an administrator of the specified failed part.

8 Claims, 9 Drawing Sheets

FIG. 8

| POWER CONSUMPTION REFERENCE VALUE TABLE OF IMAGE FORMING APPARATUS | |
|---|---|
| STATUS | POWER (Wh) |
| OFF | 0 |
| STANDBY | 1 |
| PRINT JOB STANDBY | 50 |
| PRINT JOB | 1000 |
| SCAN JOB STANDBY | 30 |
| SCAN JOB | 300 |

IMAGE FORMING APPARATUS, CONTROLLING METHOD THEREFOR, AND STORAGE MEDIUM

BACKGROUND OF THE INVENTION

1. Field of the Invention

The present invention relates to an image forming apparatus, a controlling method therefor, and a storage medium, and more particularly, to a power control technique when an abnormality occurs in an image forming apparatus.

2. Description of the Related Art

Japanese Laid-Open Patent Publication (Kokai) No. 2002-232625 discloses an image forming apparatus including: a unit configured to detect a communication error of a command or the like between units in the apparatus; and a unit configured to notify a user of content of the error, so as to enable the user to handle the communication error at the occurrence of the communication error.

In conventional image forming apparatuses, electrification of a part with a problem is cut off, or supply of main power is terminated, when an abnormality occurs in the power supply. Particularly, disclosed is a method of handling an abnormality according to the type of the abnormality, such as a degree of importance thereof and a degree of urgency thereof, from a serious abnormality in which the power needs to be immediately turned off to a minor abnormality in which electrification of part of the electrical circuit needs to be temporarily cut off (see Japanese Laid-Open Patent Publication (Kokai) No. 2012-123242).

However, there is a problem in Japanese Laid-Open Patent Publication (Kokai) No. 2002-232625 that whether the communication error between units in the apparatus is caused by an electrical failure or by a software failure of a processor, such as a CPU, cannot be specified, and further the failed part cannot be specified.

In Japanese Laid-Open Patent Publication (Kokai) No. 2012-123242, each unit, such as a heater circuit for fixing, recording paper transport rollers, a controller substrate, a printer engine substrate, and a scanner substrate, includes a power sensor, and this increases the cost.

SUMMARY OF THE INVENTION

The present invention has been made in view of the problems, and the present invention provides an image forming apparatus that can specify the cause and the part of an electrical failure occurred therein with an inexpensive configuration and that can facilitate the maintenance by a user or an administrator, a controlling method therefor, and a storage medium.

A first aspect of the present invention provides an image forming apparatus comprising a power supply unit configured to supply power from an AC power source to function units in the image forming apparatus, a power detection unit a detect a value of the power supplied by the power supply unit from the AC power source to the function units in the image forming apparatus, and a first control unit configured to acquire the value detected by the power detection unit to control the power supply by the power supply unit based on the acquired value, wherein the first control unit is configured to execute a specification task for specifying a state of the image forming apparatus, a failure determination task for determining, based on the state of the image forming apparatus specified in the specification task and the value detected by the power detection unit, whether or not there is an electrical failure, a self-diagnostic task for separately supplying, by the power supply unit, the power from the AC power source to the function units in the image forming apparatus and specifying an electrically failed part based on a state of the image forming apparatus estimated at the separate supply and the value detected by the power detection unit if it is determined in the failure determination task that there is an electrical failure, and a first notification task for notifying a user or an administrator of the failed part specified in the self-diagnostic task.

According to the present invention, the cause and the part of an electrical failure occurred in an image forming apparatus can be specified with an inexpensive configuration, and the maintenance by a user or an administrator can be facilitated.

Further features of the present invention will become apparent from the following description of exemplary embodiments (with reference to the attached drawings).

BRIEF DESCRIPTION OF THE DRAWINGS

FIG. 8 is a diagram showing an example of a power consumption reference value table indicating reference values of power consumption according to the status of the image forming apparatus of FIG. 2.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

First Embodiment

Figure 1:
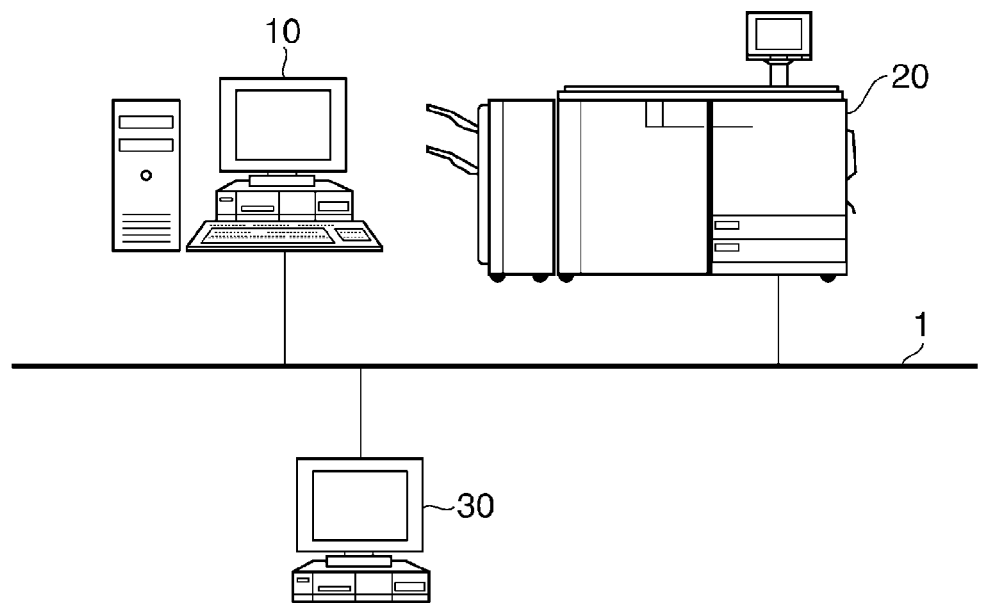
FIG. 1 is a block diagram showing a schematic configuration of a print system including an image forming apparatus according to a first embodiment of the present invention.

FIG. 1 is a block diagram showing a schematic configuration of a print system including an image forming apparatus according to a first embodiment of the present invention.

In FIG. 1, a host computer 10, a print server 30, and an image forming apparatus 20, such as an MFP, are connected to a LAN 1 in the print system. It should be noted that the print system in the present invention is not limited to the illustrated connection configuration.

Figure 2:
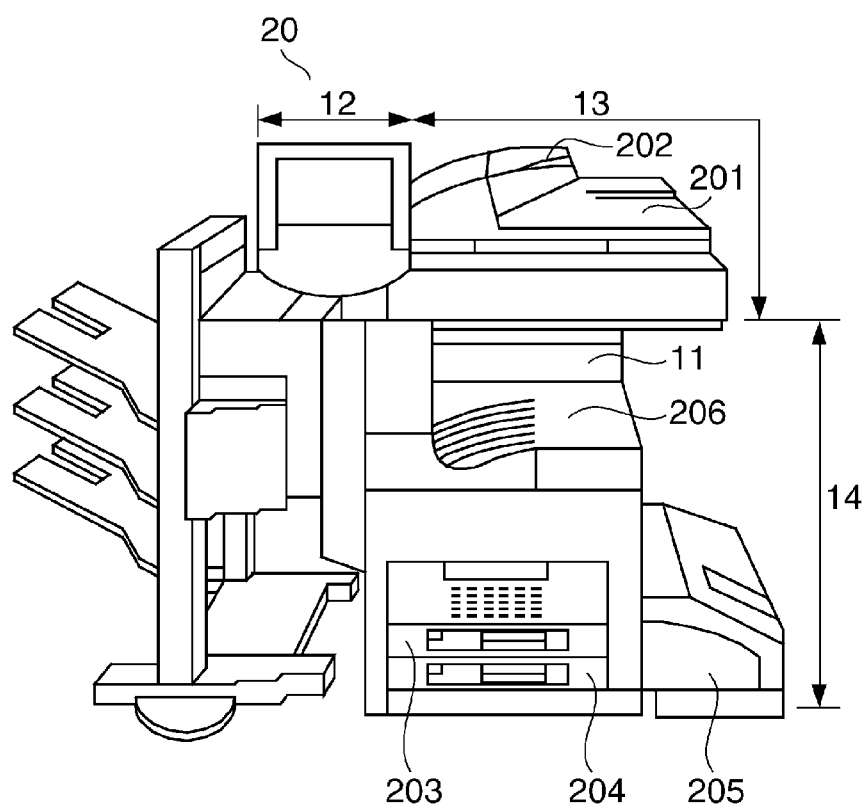
FIG. 2 is a diagram showing an appearance of the image forming apparatus in FIG. 1.

The host computer (hereinafter, simply referred to "PC") 10 is an information processing apparatus, such as a so-called personal computer. The PC 10 can use an FTP or SMB protocol to transmit and receive files and emails through the LAN 1. The PC 10 can also transmit print jobs to the image forming apparatus 20 from a printer driver through the print server 30 to instruct printing. The PC 10 can periodically inquire the image forming apparatus 20 about the status of the image forming apparatus 20. In response to the request from the PC 10, the image forming apparatus 20 can return information, such as information indicating whether printing is possible. FIG. 2 shows an appearance of the image forming apparatus 20.

In FIG. 2, the image forming apparatus 20 includes: a scanner unit 13 that is an image input device; a printer unit 14 that is an image output device; a controller unit 11 that controls operation of the entire image forming apparatus 20; and an operation unit 12 that is a user interface (UI).

The scanner unit 13 inputs reflected light, which is obtained by exposing and scanning an image on a document, to a CCD to convert information of the image to an electrical signal. The scanner unit 13 further converts the electrical signal to RGB luminance signals and outputs the luminance signals to the controller unit 11 as image data.

The document is set on a tray 202 of a document feeder 201. When the user instructs the start of reading from the operation unit 12, a document reading instruction is provided from the controller unit 11 to the scanner unit 13.

When the scanner unit 13 receives the instruction, the scanner unit 13 feeds the document sheet-by-sheet from the tray 202 of the document feeder 201 to perform reading operation of the document. It should be noted that the reading method of the document may not be an automatic feeding system of the document feeder 201. The document may be mounted on a glass surface not shown, and an exposure unit may be moved to scan the document.

The printer unit 14 forms the image data received from the controller unit 11 on paper. It should be noted that although the image forming system of the printer unit 14 may be an electrophotographic system using a photosensitive drum and a photosensitive belt, the system is not limited to this. For example, an inkjet system of discharging ink from a micro nozzle array to print the image data on the paper can be applied.

The printer unit 14 is provided with a plurality of paper cassettes 203, 204, and 205 that allow selecting different paper sizes, different paper orientations, or different paper types. The paper after printing is discharged to a paper discharge tray 206.

Figure 3:
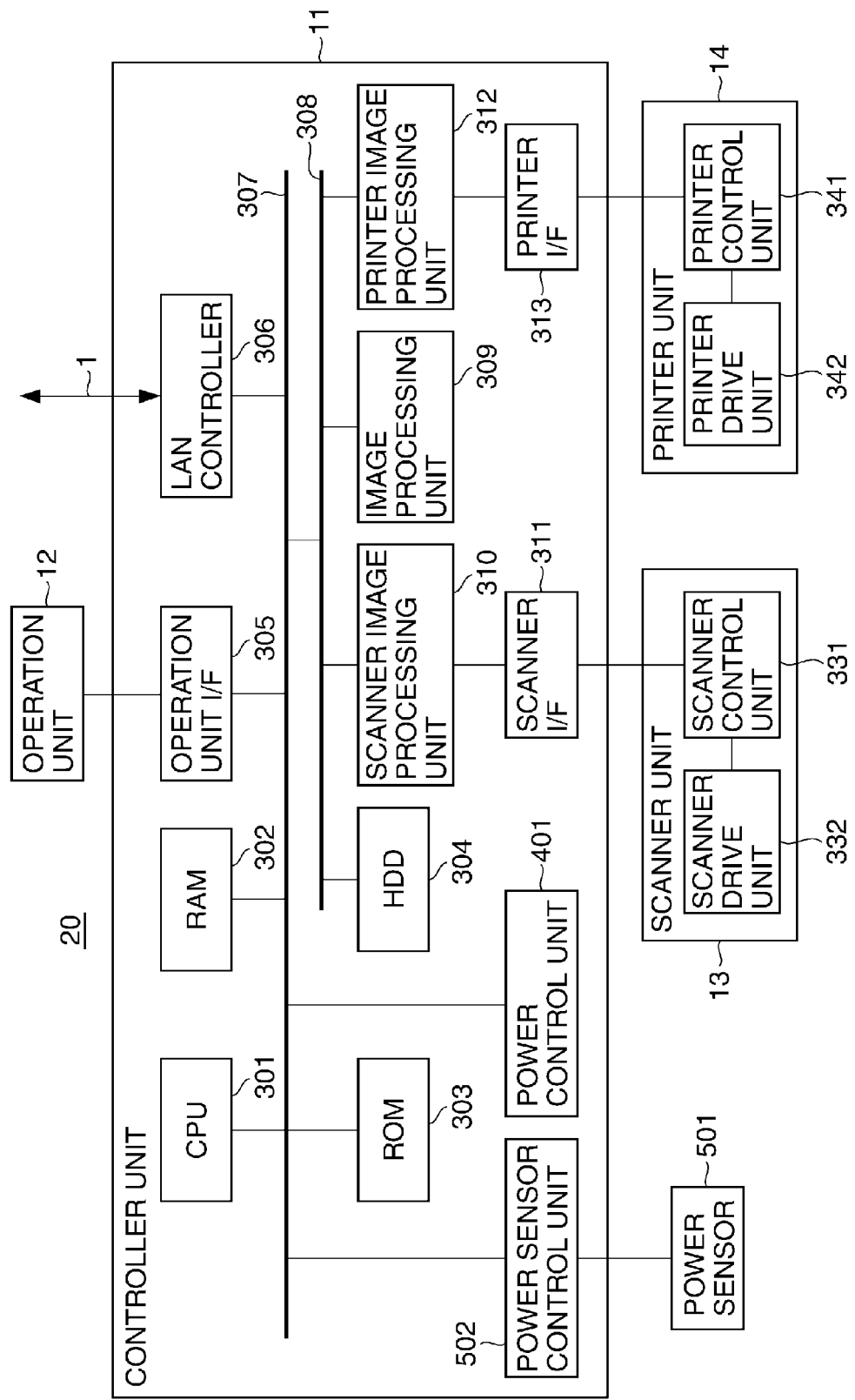
FIG. 3 is a block diagram showing a schematic configuration inside of the image forming apparatus of FIG. 2.

FIG. 3 is a block diagram showing a schematic configuration inside of the image forming apparatus 20 of FIG. 2.

The controller unit 11 is electrically connected to the scanner unit 13 and the printer unit 14 and is also connected to the PC 10 and the print server 30 through the LAN 1. As a result, image data and device information can be input and output to/from the controller unit 11.

Based on a control program and the like stored in a ROM 303, the CPU 301 comprehensively controls access to various devices being connected and also comprehensively controls various processes executed in the controller.

A RAM 302 is a system work memory for operating the CPU 301 and is a memory for temporarily storing image data. The RAM 302 is made of an SRAM that holds the stored content after the power is turned off (or after the power is cut off) and a DRAM that deletes the stored content after the power is turned off.

The ROM 303 stores a boot program and the like of the apparatus. An HDD 304 is a hard disk drive that can store system software and image data.

An operation unit I/F 305 is an interface unit for connecting a system bus 307 and the operation unit 12. The operation unit I/F 305 receives image data to be displayed on the operation unit 12 from the system bus 307 to output the image data to the operation unit 12 and outputs information input from the operation unit 12 to the system bus 307.

A LAN controller 306 is connected to the LAN 1 and the system bus 307 to control input and output of information. The LAN controller 306 also includes a power receiving unit of Power Over Ethernet (registered trademark) (hereinafter, simply referred to "POE") which can receive power supply from a LAN cable. Therefore, the LAN controller 306 can be operated not only by the power supplied from the power source of the image forming apparatus 20, but also by the power supplied through the POE.

An image bus 308 is a transmission path for exchanging image data and comprised of a bus such as a PCI bus, IEEE 1394 bus, or the like.

The image processing unit 309 can read image data stored in the RAM 302 to execute image processing of enlargement, reduction, or color adjustment of JPEG, JBIG, and the like.

A scanner image processing unit 310 corrects, processes, and edits image data received from the scanner unit 13 through a scanner I/F 311. It should be noted that the scanner image processing unit 310 determines whether the received image data is a color document or a black and white document and determines whether the received image data is a text document or a photographic document. The result of determination is attached to the image data. The attached information will be called attribute data.

A printer image processing unit 312 applies image processing to image data with reference to the attribute data of the image data. The image data after the image processing is output to the printer unit 14 through a printer I/F 313.

A scanner control unit 331 communicates with the CPU 301 to receive setting information and the like for the scanner set by the user and controls a scanner drive unit 332 based on the information. It should be noted that in place of the scanner control unit 331, the CPU 301 may control the scanner drive unit 332.

The scanner drive unit 332 physically operates like a motor for paper transport of ADF not shown. The scanner drive unit 332 operates based on the control by the scanner control unit 331.

A printer control unit 341 communicates with the CPU 301 to receive setting information and the like for the printer set by the user and controls a printer drive unit 342 based on the information. It should be noted that in place of the printer control unit 341, the CPU 301 may control the printer drive unit 342.

The printer drive unit 342 physically operates like a fixing device and a paper transport motor not shown. The printer drive unit 342 operates based on the control by the printer control unit 341.

A power control unit 401 controls the power supply at startup and at power-off and controls the change in the power status such as shift to and recovery from a power saving state. The power control unit 401 is a part that detects a recovery factor (for example, reception of FAX and press of switch) for recovery from the power saving state and controls the power supply according to the recovery factor when the status shifts to a standby state. The CPU 301 can change the setting of the recovery factor before the shift to the power saving state.

A power sensor control unit 502 always monitors a power value detected by a power sensor 501 to manage the power supply and notifies the CPU 301 of the power value information through command communication. The power sensor 501 is a power detection unit that detects the power value of the AC power supplied from the plug of the image forming apparatus 20 to the controller unit 11, the scanner unit 13, and the printer unit 14.

Figure 4:
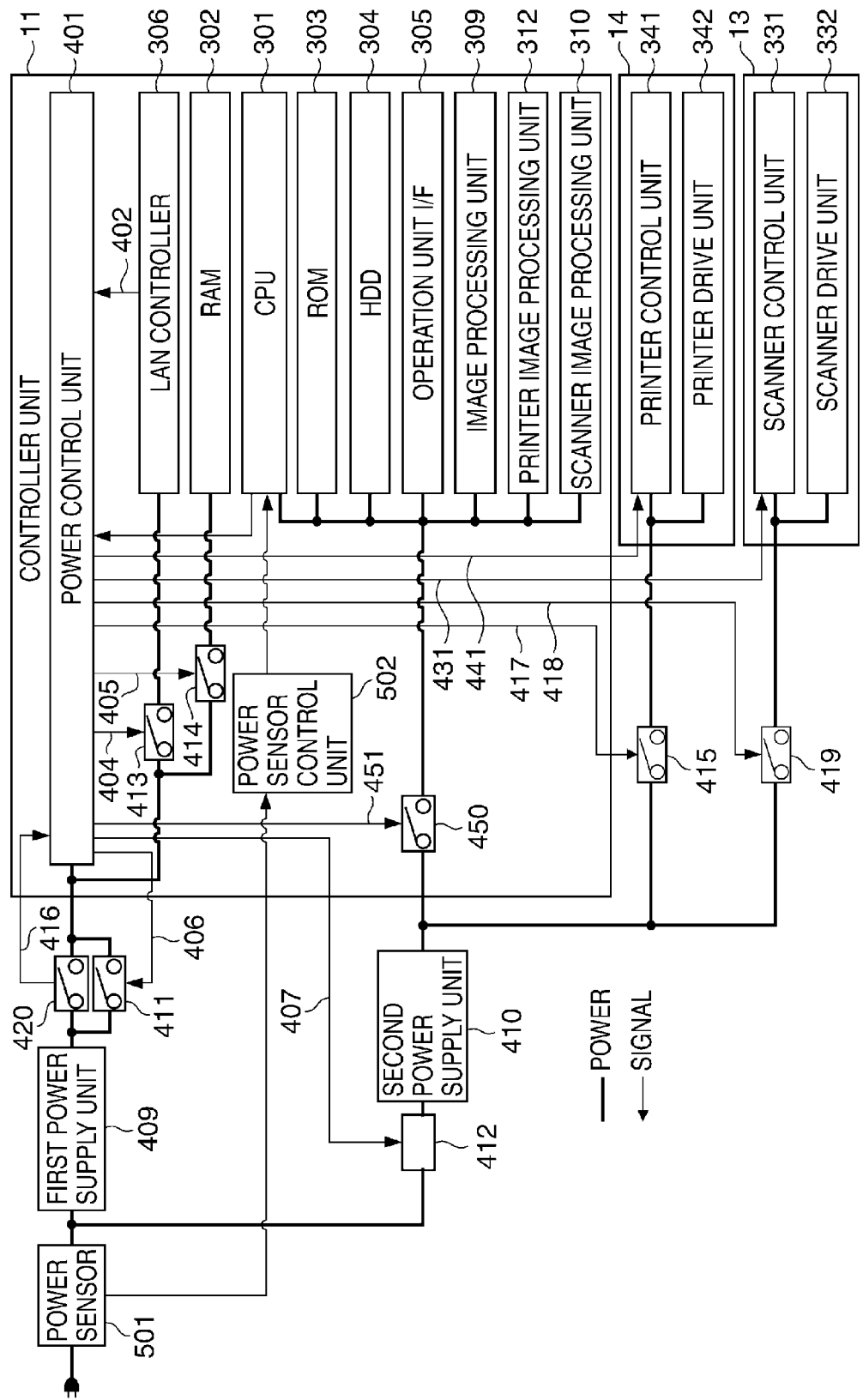
FIG. 4 is a block diagram showing a hardware configuration regarding power control of a controller unit, a scanner unit, and a printer unit in FIG. 3.

FIG. 4 is a block diagram showing a hardware configuration regarding the power control of the controller unit 11, the scanner unit 13, and the printer unit 14 in FIG. 3.

The power control unit 401 receives a command from the CPU 301, a Wake signal 402 described later, or the like to control power supply from a first power supply unit 409 or a second power supply unit 410 to each apparatus according to the command/signal.

At recovery from the power saving state, the power control unit 401 outputs operation mode setting signals 431 and 441 for notifying whether to recover the image forming apparatus 20 from the power saving state with the printer drive unit 342 and the scanner drive unit 332 operated or to start the image forming apparatus 20 with the printer drive unit 342 and the scanner drive unit 332 terminated. The power control unit 401 determines the logic of the operation mode setting signals 431 and 441 according to the recovery factor generated in the power saving state.

The Wake signal 402 is a signal for the LAN controller 306 to notify the power control unit 401 of the reception of a packet for the image forming apparatus 20 by the LAN controller 306 through the LAN 1 when the image forming apparatus 20 is in the power saving state. When the power control unit 401 receives the Wake signal 402, the power control unit 401 controls control signals 404 to 407, 417, 418, and 451 to select the power source to be supplied to each device. The control signals 404 to 407, 417, 418, and 451 are signals for controlling whether to supply power to each device.

Switches 411 to 415, 419, and 450 are switches controlled by the control signals 404 to 407, 417, 418, and 451. The switches 411 to 415, 419, and 450 can be controlled by the control signals 404 to 407, 417, 418, and 451 to change the power supply status of each device. The switches 411 to 415, 419, and 450 are FETs, relay switches, or the like.

The control signal 404 and the switch 413 control the power supply from the first power supply unit 409 to the LAN controller 306. More specifically, the power is supplied to the LAN controller 306 when the image forming apparatus 20 is in the standby state or the power saving state, and the power supply to the LAN controller 306 is terminated when the image forming apparatus 20 is in the off-state.

The control signal 405 and the switch 414 control the power supply from the first power supply unit 409 to the RAM 302. For example, the power is supplied to the RAM 302 in a self-refresh state when the image forming apparatus 20 is in the power saving state.

The control signal 406 and the switch 411 control the power supply from the first power supply unit 409 to the controller unit 11.

When a switch 420 described later is turned on, the power control unit 401 turns on the control signal 406 and the switch 411. As a result, the power can be supplied to the controller unit 11 even when the user turns off the switch 420. In this case, the power control unit 401 detects that the switch 420 is turned off based on a signal 416 for acquiring an on/off state of the switch 420. The power control unit 401 notifies the CPU 301 of the detection, which enables to turn off the power of each device after a normal shutdown process.

The switch 420 is a main switch for the user to turn on and off the power supply to the image forming apparatus 20. When the user turns on the switch 420, power is supplied from the first power supply unit 409 to the controller unit 11.

The control signal 407 and the switch 412 control the supply of AC power to the second power supply unit 410 and further control the power supply to each device. For example, regarding the power supply to the image processing unit 309, when in the power saving state, the switch 412 is controlled to be turned off so as to terminate the power supply from the second power supply unit 410. On the other hand, when in the standby state, the switch 412 is controlled to be turned on so that the power from the second power supply unit 410 is supplied.

The first power supply unit 409 converts AC power to DC power and supplies power (first power) to the power control unit 401 and the like. The first power supplied from the first power supply unit 409 is power supplied to the power control unit 401 and the like even when the image forming apparatus 20 is in the power saving state. Other than the power control unit 401, the first power is also supplied to the LAN controller 306 to detect a packet from the LAN 1 to the apparatus for the recovery from the power saving state.

The second power supply unit 410 converts AC power to DC power and supplies power (second power) to each device. The second power supplied from the second power supply unit 410 is power for which the power supply is terminated when the image forming apparatus 20 is in the power saving state. The second power supply unit 410 supplies power to various devices that require power supply when the image forming apparatus 20 is in the power saving state.

The operation mode setting signals 431 and 441 are signals for controlling whether to recover the image forming apparatus 20 with the printer drive unit 342 and the scanner drive unit 332 operated or to start the image forming apparatus 20 with the printer drive unit 342 and the scanner drive unit 332 terminated, when the power saving state is switched to the standby state based on a signal controlled by the power control unit 401.

The printer control unit 341 and the scanner control unit 331 control to operate or terminate the printer drive unit 342 and the scanner drive unit 332 based on the logic of the operation mode setting signals 431 and 441 at the recovery from the power saving state. For example, when the LAN controller 306 receives a print job when the image forming apparatus 20 is in the power saving state, the power control unit 401 shifts the operation mode setting signal 431 to the terminated state and then shifts the operation mode setting signal 441 to the operated state so as to recover the image forming apparatus 20 with the scanner drive unit 332 terminated and the printer drive unit 342 operated.

Figure 5A:
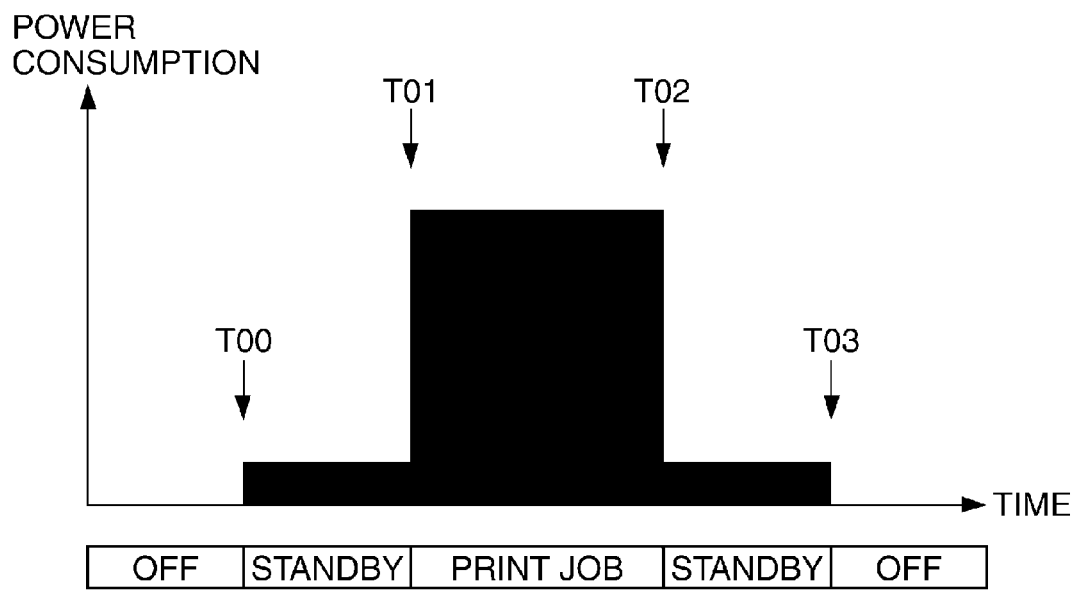
FIG. 5A is a diagram showing a power consumption transition of the image forming apparatus of FIG. 2 when a print job is normally executed.

FIG. 5A is a diagram showing a power consumption transition of the image forming apparatus 20 of FIG. 2 when a print job is normally executed.

In FIG. 5A, the user turns on the switch 420 to start the power supply from the first power supply unit 409 and the second power supply unit 410 to the controller unit 11, and the image forming apparatus 20 is shifted to the standby state. AC power is distributed from the plug to the first power supply unit 409 and the second power supply unit 410. Therefore, the power sensor 501 detects the power value, and the power sensor control unit 502 notifies the CPU 301 of a power value detected by the power sensor 501 (T00).

When the PC 10 inputs a print job to the image forming apparatus 20 based on an instruction by the user, the image forming apparatus 20 is shifted to a print job execution state. In this case, the switch 415 is turned on to supply power from the second power supply unit 410 to the printer unit 14, and the power value detected by the power sensor 501 increases (T01).

When the print job is completed, the image forming apparatus 20 is shifted to the standby state. In this case, the switch 415 is turned off to terminate the power supplied from the second power supply unit 410 to the printer unit 14, and the power value detected by the power sensor 501 decreases (T02). Subsequently, the user turns off the switch 420 to terminate the power supply from the first power supply unit 409 and the second power supply unit 410 to the controller unit 11, and the image forming apparatus 20 is shifted to the off-state (T04).

Figure 5B:
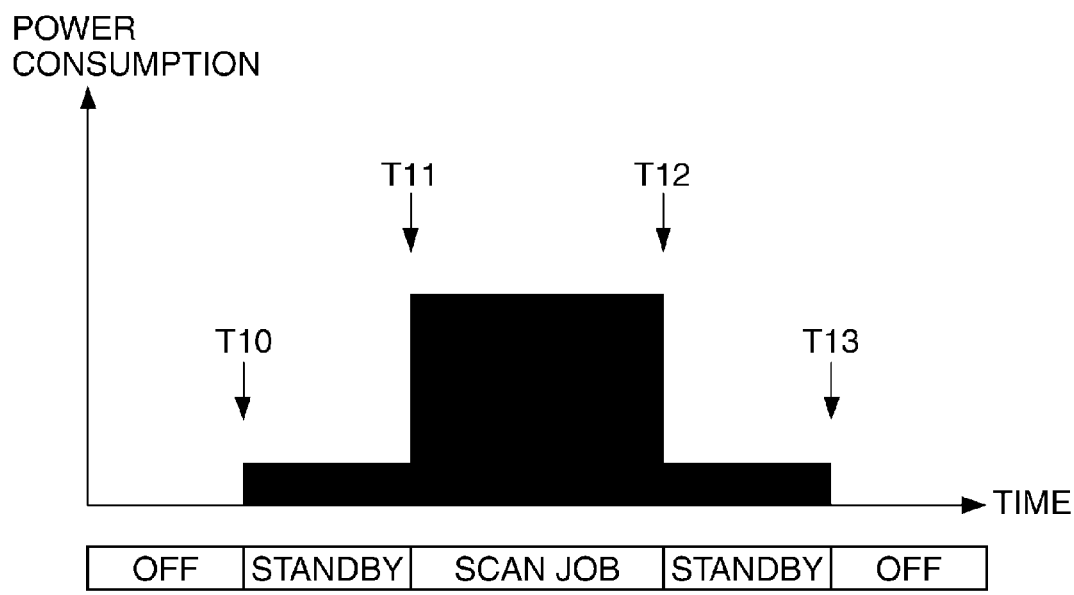
FIG. 5B is a diagram showing a power consumption transition of the image forming apparatus of FIG. 2 when a scan job is normally executed.

FIG. 5B is a diagram showing a power consumption transition of the image forming apparatus 20 of FIG. 2 when a scan job is normally executed.

In FIG. 5B, the user turns on the switch 420 to start the power supply from the first power supply unit 409 and the second power supply unit 410 to the controller unit 11, and the image forming apparatus 20 is shifted to the standby state. AC power is distributed from the plug to the first power supply unit 409 and the second power supply unit 410. Therefore, the power sensor 501 detects the power value, and the power sensor control unit 502 notifies the CPU 301 of the power value detected by the power sensor 501 (T10).

The user instructs a scan job from the operation unit 12, and the image forming apparatus 20 is shifted to a scan job execution state. In this case, the switch 415 is turned on to supply power from the second power supply unit 410 to the scanner unit 13, and the power value detected by the power sensor 501 increases (T11).

When the scan job is completed, the image forming apparatus 20 is shifted to the standby state. In this case, the switch 419 is turned off to terminate the power supplied from the second power supply unit 410 to the scanner unit 13, and the power value detected by the power sensor 501 decreases (T12). Subsequently, the user turns off the switch 420 to terminate the power supply from the first power supply unit 409 and the second power supply unit 410 to the controller unit 11, and the image forming apparatus 20 is shifted to the off-state (T13).

Figure 6:
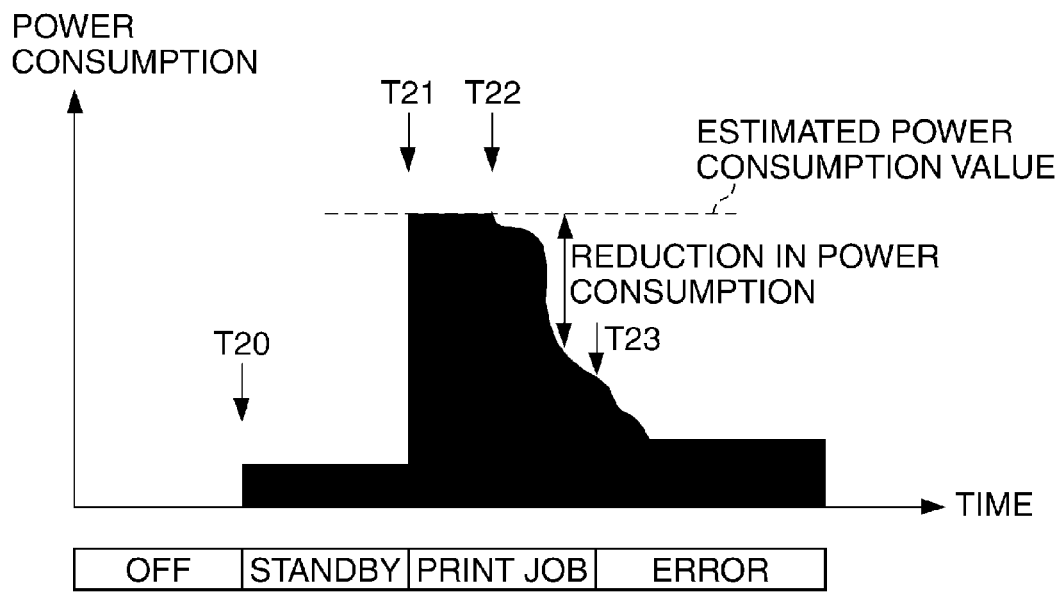
FIG. 6 is a diagram showing a power consumption transition of the image forming apparatus of FIG. 2 when an electrical failure occurs in a print job.

FIG. 6 is a diagram showing a power consumption transition of the image forming apparatus 20 of FIG. 2 when an electrical failure occurs in a print job.

In FIG. 6, the user turns on the switch 420 to start the power supply from the first power supply unit 409 and the second power supply unit 410 to the controller unit 11, and the image forming apparatus 20 is shifted to the standby state. AC power is distributed from the plug to the first power supply unit 409 and the second power supply unit 410. Therefore, the power sensor 501 detects the power value, and the power sensor control unit 502 notifies the CPU 301 of the power value detected by the power sensor 501 (T20).

When the PC 10 inputs a print job to the image forming apparatus 20 based on an instruction by the user, the image forming apparatus 20 is shifted to the print job execution state. In this case, the switch 419 is turned on to supply power from the second power supply unit 410 to the printer unit 14, and the power value detected by the power sensor 501 increases (T21). Subsequently, the power supply becomes impossible during the print job execution due to an electrical failure of the printer control unit 341 or the printer drive unit 342 or due to a malfunction of the second power supply unit 410. Therefore, the power value detected by the power sensor 501 is smaller than an estimated power value (T22).

Further, when the communication with the printer control unit 341 becomes impossible, and the CPU 301 is shifted to an error state. The CPU 301 controls the operation unit 12 through the operation unit I/F 305 to display that the communication error occurs between the units in the image forming apparatus 20 to notify the user of the communication error (T23).

A process executed when the communication error described in FIG. 6 occurs during the print job execution in the image forming apparatus 20 will be described with reference to FIG. 7.

Figure 7:
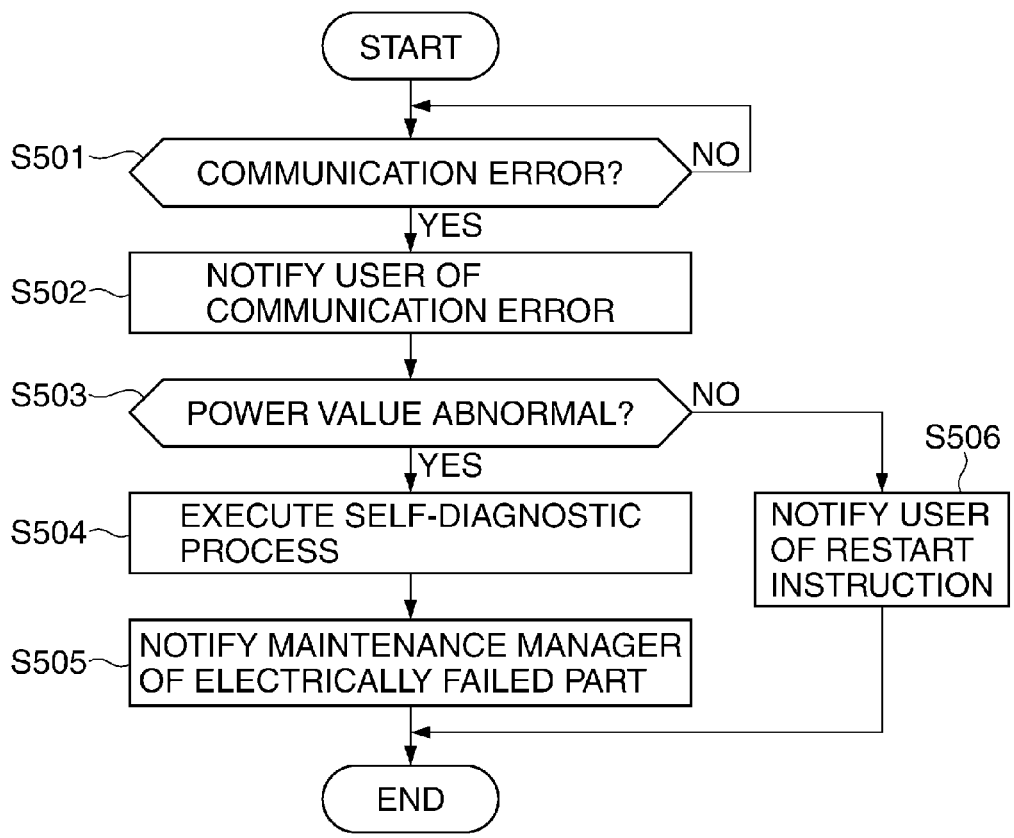
FIG. 7 is a flow chart showing a flow of a process executed when a communication error occurs between units in the image forming apparatus of FIG. 2 during print job execution in the apparatus.

FIG. 7 is a flow chart showing a flow of the process executed when the communication error occurs between units in the image forming apparatus 20 of FIG. 2 during the print job execution therein.

In FIG. 7, if a communication error occurs after the communication between the CPU 301 and the printer control unit 341 becomes impossible due to the electrical failure as described above or due to a failure of a software factor such as a hang-up (YES in step S501), the process proceeds to step S502. Step S501 functions as a communication error determination task for determining whether there is a communication error.

In step S502, the CPU 301 displays the communication error on the operation unit 12 through the operation unit I/F 305 to notify the user of the communication error (second notification task).

The CPU 301 specifies the state (status) of the image forming apparatus 20 and compares the power value (actual power consumption value) detected by the power sensor 501, which is notified by the power sensor control unit 502, and power consumption reference values in a power consumption reference value table shown in FIG. 8 stored in advance in the HDD 304 to determine whether there is a power value abnormality (step S503: specification task, failure determination task). In the present embodiment, the specified state of the image forming apparatus 20 is "print job in execution", and the CPU 301 acquires the power consumption reference value of the print job in the status of the power consumption reference value table shown in FIG. 8, as a value to be compared with the power value (power consumption value) detected by the power sensor 501. If the difference between the power value detected by the power sensor 501 and the power consumption reference value is equal to or smaller than a predetermined value, the CPU 301 determines that there is no power value abnormality (NO in step S503). The CPU 301 determines that the communication error is caused by the software factor and notifies the user of a restart instruction of the image forming apparatus 20 (step S506). Subsequently, the process is terminated. The administrator or the like of the image forming apparatus 20 can set in advance the predetermined value used for determining whether there is a power value abnormality from the difference between the power value detected by the power sensor 501 and the power consumption reference value.

On the other hand, if the difference between the power value detected by the power sensor 501 and the power consumption reference value exceeds the predetermined value, the CPU 301 determines that there is a power value abnormality (YES in step S503). Namely, the CPU 301 determines that the communication error is caused by an electrical failure. Then the CPU 301 executes a self-diagnostic process described later in FIG. 9 (step S504: self-diagnostic task). The CPU 301 specifies the part of the electrical failure in the image forming apparatus 20 from the result of the self-diagnostic process and notifies the maintenance manager of the image forming apparatus 20 of the electrically failed part (step S505: first notification task). The process is terminated.

FIG. 8 is a diagram showing an example of the power consumption reference value table indicating reference values of power consumption according to the status (state) of the image forming apparatus 20 of FIG. 2.

In FIG. 8, the power consumption reference value is 0 when the status of the image forming apparatus 20 is an "off" mode. The power consumption reference value when the status of the image forming apparatus 20 is a "standby" mode (i.e. in a state where the controller unit 11 is electrified, and a job can be received), is 1 Wh.

The power consumption reference value when the status of the image forming apparatus 20 is a "print job standby" mode (i.e. in a state, where the controller unit 11 and the printer unit 14 are electrified, and a printer job can be executed), is 50 Wh.

The power consumption reference value when the status of the image forming apparatus 20 is a "print job" mode (i.e. in a state, where a print job is in execution), is 1000 Wh.

The power consumption reference value when the status of the image forming apparatus 20 is a "scan job standby" mode (i.e. in a state, where the controller unit 11 and the scanner unit 13 are electrified, and a scan job can be executed), is 30 Wh.

The power consumption reference value when the status of the image forming apparatus 20 is a "scan job" mode (i.e. in a state, where a scan job is in execution), is 300 Wh.

Figure 9:
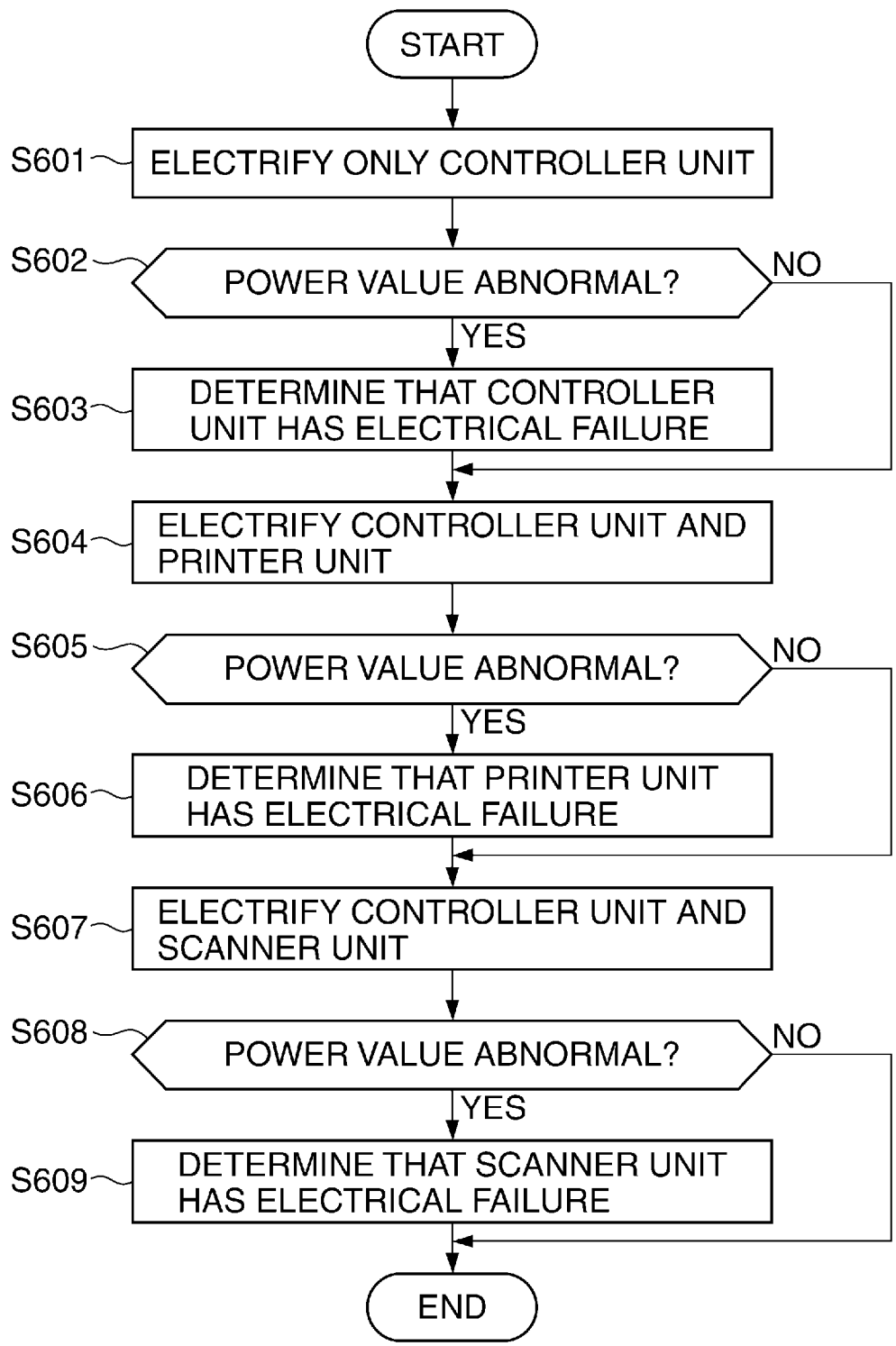
FIG. 9 is a flow chart showing details of a self-diagnostic process executed in step S504 of FIG. 7.

FIG. 9 is a flow chart showing details of the self-diagnostic process executed in step S504 of FIG. 7.

In FIG. 9, the power control unit 401 turns off the switches 415 and 419 to electrify only the controller unit 11 (step S601). The power consumption value of the image forming apparatus 20 in this case is usually equivalent to the power consumption value when the status of the image forming apparatus 20 is standby. More specifically, the power value detected by the power sensor 501 estimated in the state of step S601 is the power consumption reference value at standby in the power consumption value table shown in FIG. 8 stored in advance in the HDD 304.

The CPU 301 refers to the power consumption reference value table shown in FIG. 8 and compares the power value detected by the power sensor 501 notified by the power sensor control unit 502 and the estimated power consumption reference value at standby to determine whether there is a power value abnormality (step S602).

If the difference between the power value detected by the power sensor 501 and the power consumption reference value at standby is equal to or smaller than the predetermined value based on the result of comparison in step S602, the CPU 301 determines that there is no power value abnormality (NO in step S602), and the process proceeds to step S604. On the other hand, if the difference between the power value detected by the power sensor 501 and the power consumption reference value at standby exceeds the predetermined value, the CPU 301 determines that there is a power value abnormality (YES in step S602). Namely, the CPU 301 determines that the communication error is caused by an electrical failure of the controller unit 11 (step S603) and the process proceeds to step S604.

In step S604, the power control unit 401 turns on the switch 415 to electrify the controller unit 11 and the printer unit 14. The power consumption value of the image forming apparatus 20 in this case is usually equivalent to the power consumption value when the status of the image forming apparatus 20 is print job standby. More specifically, the power value detected by the power sensor 501 estimated in the state of step S604 is the power consumption reference value at print job standby in the power consumption value table shown in FIG. 8.

In step S605, the CPU 301 refers to the power consumption reference value table shown in FIG. 8 and compares the power value detected by the power sensor 501 notified by the power sensor control unit 502 and the estimated power consumption reference value at print job standby to determine whether there is a power value abnormality.

If the difference between the power value detected by the power sensor 501 and the power consumption reference value at print job standby is equal to or smaller than the predetermined value based on the result of comparison in step S605, the CPU 301 determines that there is no power value abnormality (NO in step S605), and the process proceeds to step S607. On the other hand, if the difference between the power value detected by the power sensor 501 and the power consumption reference value at print job standby exceeds the predetermined value, the CPU 301 determines that there is a power value abnormality (YES in step S605). Namely, the CPU 301 determines that the communication error is caused by an electrical failure of the printer unit 14 (step S606).

In step S607, the power control unit 401 turns off the switch 415 and turns on the switch 419 to electrify the controller unit 11 and the scanner unit 13. The power consumption value of the image forming apparatus 20 in this case is usually equivalent to the power consumption value when the status of the image forming apparatus 20 is scan job standby. More specifically, the power value detected by the power sensor 501 estimated in step S607 is the power consumption reference value at scan job standby in the power consumption value table shown in FIG. 8.

In step S608, the CPU 301 refers to the power consumption reference value table shown in FIG. 8 and compares the power value detected by the power sensor 501 notified by the power sensor control unit 502 and the estimated power consumption reference value at scan job standby.

If the difference between the power value detected by the power sensor 501 and the power consumption reference value at scan job standby is equal to or smaller than the predetermined value based on the result of comparison in step S608, the CPU 301 determines that there is no power value abnormality (NO in step S608), and the process is terminated. On the other hand, if the difference between the power value detected by the power sensor 501 and the power consumption reference value at scan job standby exceeds the predetermined value, the CPU 301 determines that there is a power value abnormality (YES in step S608). Namely, the CPU 301 determines that the communication error is caused by an electrical failure of the scanner unit 13 (step S609), and the process is terminated.

As described, according to the present embodiment, the execution of the process can specify the cause and the fault part of an electrical failure occurred in the image forming apparatus 20 with an inexpensive configuration and can facilitate the maintenance by the user or the administrator.

Although the power consumption reference value table according to the status shown in FIG. 8 is used to specify the electrically fault part in the self-diagnostic process shown in FIG. 9, the process is not limited to this. For example, a power consumption reference value table shown in FIG. 12 may be used.

Figures 11, 12:
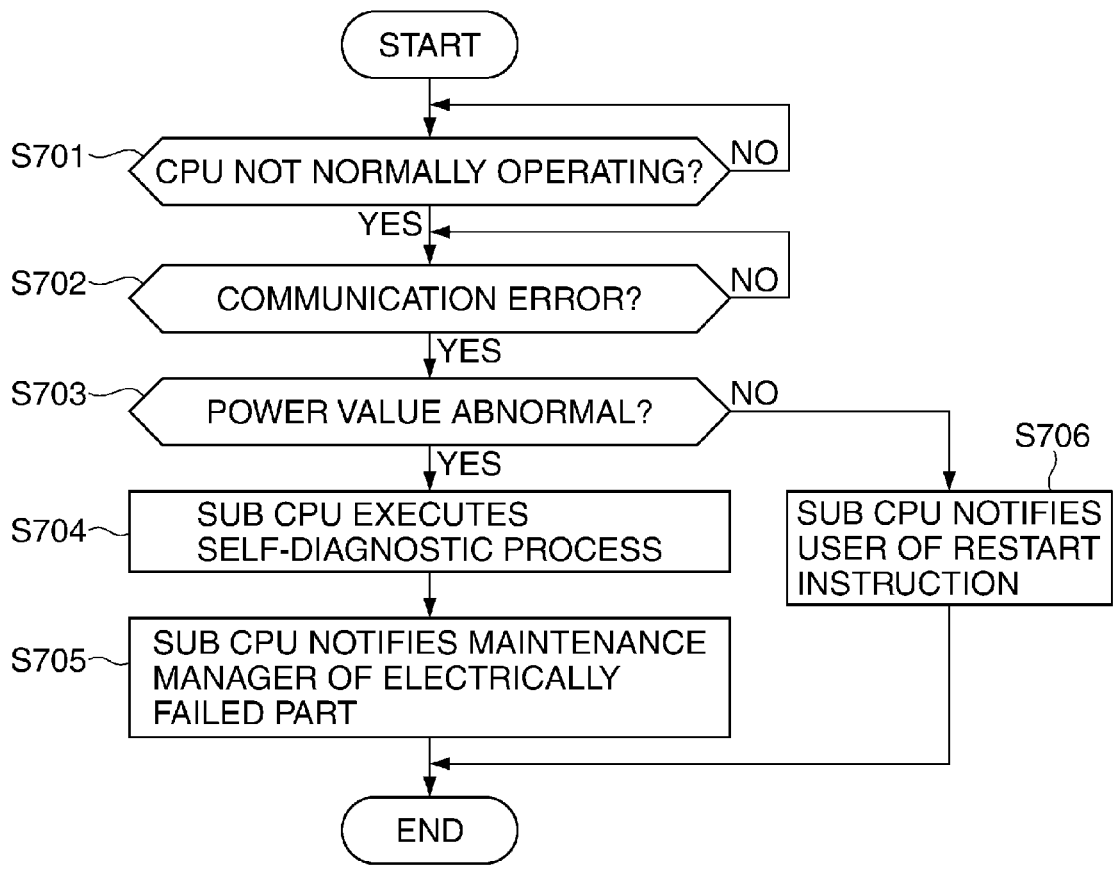
FIG. 11 is a flow chart showing a flow of a process executed when a CPU 301 is not operating normally during print job execution in the image forming apparatus of FIG. 10.
FIG. 12 is a diagram showing an example of a power consumption reference value table indicating reference values of power consumption when power is separately supplied to the function units in the image forming apparatus of FIG. 2.

FIG. 12 is a diagram showing an example of a power consumption reference value table indicating reference values of power consumption when power is separately supplied to the function units in the image forming apparatus 20 of FIG. 2.

In the case that the electrified part is the controller unit in FIG. 12, the power consumption reference value when only the controller unit 11 is electrified is 0. In the case that the electrified parts are the controller unit and the printer unit 14, the power consumption reference value when the controller unit 11 and the printer unit 14 are electrified is 50 Wh. In the case that the electrified parts are the controller unit 11 and the scanner unit 13, the power consumption reference value when the controller unit 11 and the scanner unit 13 are electrified is 30 Wh. In this way, the self-diagnostic process can also be realized by using the power consumption reference value table in which the electrified parts of the units in the image forming apparatus 20 are changed.

Second Embodiment

In the first embodiment, whether the power value detected by the power sensor 501 is abnormal cannot be determined when the CPU 301 is not operating due to an electrical failure or when the CPU 301 is not electrified in the power saving mode (hereinafter, these cases will be called a case in which the CPU 301 is not normally operating). Therefore, it is difficult to specify the failed part of the error occurred in the image forming apparatus 20. Thus, an image forming apparatus according to a second embodiment includes a sub CPU 601 added to the image forming apparatus 20 according to the first embodiment. It should be noted that the same reference numerals are used for the same parts as in the first embodiment, and the duplicated description will be omitted.

Figure 10:
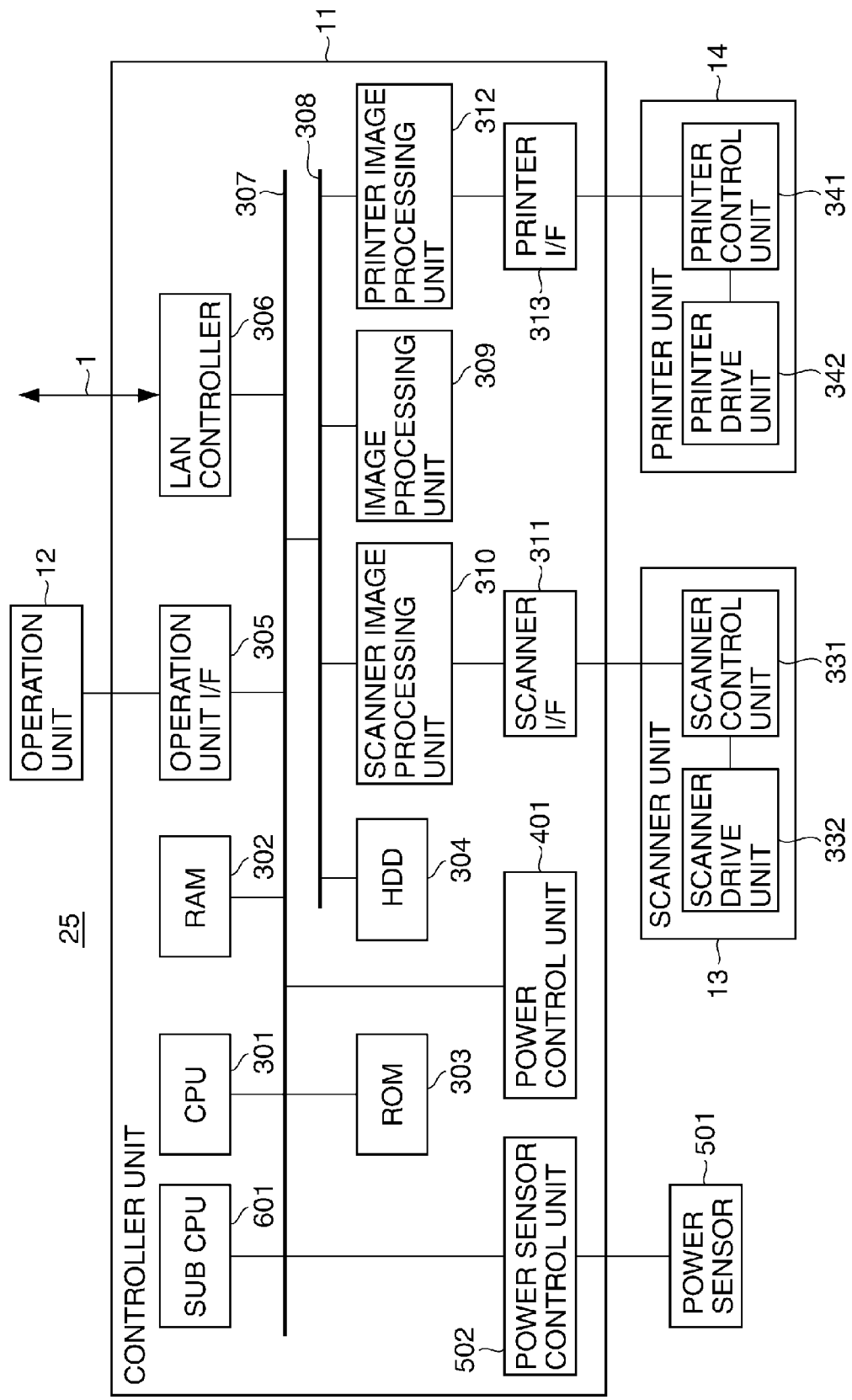
FIG. 10 is a block diagram showing a schematic configuration inside of an image forming apparatus according to a second embodiment of the present invention.

FIG. 10 is a block diagram showing a schematic configuration inside of the image forming apparatus according to the second embodiment of the present invention.

An image forming apparatus 25 shown in FIG. 10 includes the sub CPU 601 added to the image forming apparatus 20 shown in FIG. 3. It is assumed that the sub CPU 601 is a processor, such as a microcomputer, smaller than the CPU 301.

FIG. 11 is a flow chart showing a flow of a process executed when the CPU 301 is not operating normally during print job execution in the image forming apparatus 25 of FIG. 10.

In FIG. 11, the sub CPU 601 monitors whether the CPU 301 is normally operating based on the data communication state of the CPU 301. As a result of the monitoring, if the sub CPU 601 determines that the CPU 301 is not normally operating (YES in step S701), the sub CPU 601 executes the process of steps S702 to S705

In place of the CPU 301, the sub CPU 601 executes the following process in steps S702 to S705. Specifically, the sub CPU 601 determines whether the communication between the CPU 301 and the printer control unit 341 has become impossible due to the electrical failure or a failure caused by a software factor such as a hang-up, and a communication error has occurred (step S702). As a result of the determination of step S702, if a communication error has occurred (YES in step S702), the sub CPU 601 specifies the state (status) of the image forming apparatus 25 and compares the power value detected by the power sensor 501 notified by the power sensor control unit 502 and the power consumption reference value in the power consumption reference value table shown in FIG. 8 to determine whether there is an abnormality in the power value (step S703). In the present embodiment, the specified state of the image forming apparatus 25 is "print job in execution", and the sub CPU 601 acquires the power consumption reference value of the print job in the status of the power consumption reference value table shown in FIG. 8, as a value to be compared with the power measurement value (power consumption value) of the power sensor 501. If the difference between the power value detected by the power sensor 501 and the acquired power consumption reference value is equal to or smaller than a predetermined value, the sub CPU 601 determines that there is no abnormality in the power value (NO in step S703). The sub CPU 601 determines that the communication error is caused by a failure, such as a hang-up, and notifies and prompts the user to restart the image forming apparatus 25 (step S706). Subsequently, the process is terminated. It should be noted that as in the first embodiment, the administrator or the like of the image forming apparatus 25 can set in advance the predetermined value used to determine whether there is an abnormality in the power value based on the difference between the power measurement value of the power sensor 501 and the power consumption reference value.

On the other hand, if the difference between the power measurement value of the power sensor 501 and the power consumption reference value exceeds the predetermined value, the sub CPU 601 determines that there is an abnormality in the power value (YES in step S703). The sub CPU 601 determines that the communication error is caused by an electrical failure and executes the self-diagnostic process (step S704). The self-diagnostic process is the same in content as in the first embodiment, and the description will be omitted here. The sub CPU 601 specifies the electrically failed part in the image forming apparatus 25 from the result of the self-diagnostic process and notifies the maintenance manager of the image forming apparatus 25 of the electrically failed part (step S705). Then, the process is terminated.

In this way, an electrical failed part in each unit of the image forming apparatus 25 can be specified even when a failure, such as a communication error, occurs while the CPU 301 is not normally operating.

The present invention can also be realized by replacing the sub CPU in the embodiments with a hardware sequencer or other simultaneous operation apparatuses. For example, the power sensor control unit 502 may execute the process of FIG. 11 executed by the sub CPU 601.

The present invention may be applied to a system including a plurality of devices or may be applied to an apparatus including one device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-003221, filed Jan. 10, 2014, which is hereby incorporated by reference herein in its entirety.

What is claimed is:

1. An image forming apparatus comprising:
a power supply unit configured to supply power from an AC power source to function units in the image forming apparatus;
a power detection unit a detect a value of the power supplied by said power supply unit from the AC power source to the function units in the image forming apparatus; and
a first control unit configured to acquire the value detected by said power detection unit to control the power supply by said power supply unit based on the acquired value, wherein
said first control unit is configured to execute:
a specification task for specifying a state of the image forming apparatus;
a failure determination task for determining, based on the state of the image forming apparatus specified in said specification task and the value detected by said power detection unit, whether or not there is an electrical failure;
a self-diagnostic task for separately supplying, by said power supply unit, the power from the AC power source to the function units in the image forming apparatus and specifying an electrically failed part based on a state of the image forming apparatus estimated at the separate supply and the value detected by said power detection unit, if it is determined in said failure determination task that there is an electrical failure; and
a first notification task for notifying a user or an administrator of the failed part specified in said self-diagnostic task.

2. The image forming apparatus according to claim 1, wherein
said first control unit is further configured to execute:
a communication error determination task for determining whether or not there is a communication error with the function units in the image forming apparatus; and
a second notification task for notifying the user when it is determined in said communication error determination task that there is a communication error.

3. The image forming apparatus according to claim 2, wherein
it is determined that the communication error is caused by a software factor if it is determined in said communication error determination task that there is a communication error and if it is not determined in said failure determination task that there is an electrical failure.

4. The image forming apparatus according to claim 1, further comprising
a holding unit configured to hold a power consumption value estimated for each state of the image forming apparatus, wherein
in said failure determination task, the estimated power consumption value in the state of the image forming apparatus specified in said specification task is acquired from said holding unit as the power consumption reference value, and it is determined that there is an electrical failure if a difference between the acquired power consumption reference value and the value detected by said power detection unit exceeds a predetermined value.

5. The image forming apparatus according to claim 4, wherein
the estimated power consumption value includes a power consumption value estimated when at least one of the function units in the image forming apparatus is electrified.

6. The image forming apparatus according to claim 1, further comprising
a second control unit configured to execute a determination task for determining based on a communication state of said first control unit whether said first control unit is normally operating, wherein
if it is determined in said determination task that said first control unit is not normally operating, said second control unit executes said specification task, said failure determination task, said self-diagnostic task, and said first notification task in place of said first control unit.

7. A controlling method for an image forming apparatus, the method comprising:
a power supply step of supplying, by a power supply unit, power from an AC power source to function units in the image forming apparatus;
a power detection step of detecting a value of the power supplied by a power detection unit from the AC power source to the function units in the image forming apparatus;
a specification step of specifying, by a first control unit, a state of the image forming apparatus;
a failure determination step of determining, based on the state of the image forming apparatus specified in said specification step and the value detected in said power detection step, whether or not there is an electrical failure;
a self-diagnostic step of separately supplying, in said power supply step, the power from the AC power source to the function units in the image forming apparatus and specifying an electrically failed part based on a state of the image forming apparatus estimated at the separate supply and the value detected in said power detection step if it is determined in said failure determination step that there is an electrical failure; and
a notification step of notifying a user or an administrator of the failed part specified in said self-diagnostic step.

8. A non-transitory computer-readable storage medium having stored therein a program for causing a computer to implement a method of controlling an image forming apparatus, the method comprising:
a power supply step of supplying, by a power supply unit, power from an AC power source to function units in the image forming apparatus;
a power detection step of detecting a value of the power supplied by a power detection unit from the AC power source to the function units in the image forming apparatus;
a specification step of specifying, by a first control unit, a state of the image forming apparatus;
a failure determination step of determining, based on the state of the image forming apparatus specified in said specification step and the value detected in said power detection step, whether or not there is an electrical failure;
a self-diagnostic step of separately supplying, in said power supply step, the power from the AC power source to the function units in the image forming apparatus and specifying an electrically failed part based on a state of the image forming apparatus estimated at the separate supply and the value detected in said power detection step if it is determined in said failure determination step that there is an electrical failure; and a notification step of notifying a user or an administrator of the failed part specified in said self-diagnostic step.

\* \* \* \* \*